United States Patent [19]
Narlock et al.

[11] Patent Number: 5,115,565
[45] Date of Patent: May 26, 1992

[54] FOOD UTENSIL

[76] Inventors: Lori L. Narlock, 1825 Levenworth St., #7, San Francisco, Calif. 94109; Gregg Emmel, 1120 Princeton Dr., Suite #2, Marina Del Rey, Calif. 90292

[21] Appl. No.: 683,193

[22] Filed: Apr. 10, 1991

[51] Int. Cl.⁵ .................. B25F 3/00; B26B 9/02
[52] U.S. Cl. .................... 30/123.6; 30/123.6
[58] Field of Search .............. 30/122, 123.5, 142, 30/152, 176, 197, 226, 279, 287, 299, 123.6

[56] References Cited

U.S. PATENT DOCUMENTS

| | | | |
|---|---|---|---|
| 669,884 | 3/1901 | Stoddard | 30/123.5 |
| 2,295,721 | 9/1942 | Doetsch | 30/353 |
| 2,455,623 | 12/1948 | Stone | 30/142 |
| 2,938,267 | 5/1960 | Tupper | 30/142 |
| 3,978,583 | 9/1976 | Papalardo | 30/123.5 |
| 4,768,288 | 9/1988 | Culbertson | 30/142 |

Primary Examiner—Douglas D. Watts
Assistant Examiner—Paul M. Heyrana, Sr.
Attorney, Agent, or Firm—Morton J. Rosenberg; David I. Klein

[57] ABSTRACT

A food utensil (10) is provided for cutting a food product (12) and removing material (18) therefrom. A flexible U-shaped gripping member (20) is provided where a base section (24) is formed in one piece formation with arm members (26,26') and extend to spoon shaped second end sections (32,32'). The spoon shaped second end sections (32,32') include serrations (36,36') for cutting through a thickened skin (14) of the food product (12) and further allowing a cut through the food material (18). A second set of tooth members (46,46') are provided for gripping a pit (16) and for removal of the pit from the food product (12). In this manner, there is provided a combination food utensil (10) which allows for neatly and simply slicing a food product and removal of the material therefrom with the further ability to scoop the material (18) from the inside of the food product (12).

19 Claims, 2 Drawing Sheets

FOOD UTENSIL

BACKGROUND OF THE INVENTION

1. Field of the Invention

This invention relates to a food utensil for cutting, severing, slicing and scooping out food material from internal a food product such as an avocado. In particular, this invention directs itself to a molded, one piece formed U-shaped gripping member which may be grasped in the hand of a user. Still further, this invention directs itself to a flexible and resilient U-shaped gripping member having a pair of arm members formed in one piece formation to a base section. Still further, this invention directs itself to a flexible U-shaped gripping member having a pair of extended arm members defining end section, spoon shaped members. Additionally, this invention directs itself to a food utensil having a flexible U-shaped gripping member with spoon shaped end sections having serrations formed on inner edges in aligned relation each with respect to the other. Additionally, this invention relates to a food utensil having a flexible U-shaped gripping member with a pair of arm members having first sections with a second set of tooth member being formed on respective arm members. More in particular, this invention relates to a flexible U-shaped gripping member wherein the second set of tooth members are adapted for gripping and removal of a pit from internal a food product.

2. Prior Art

Food utensils for gripping food products in a manual operation are known in the art. The best prior art known to Applicants include U.S. Pat. Nos. 2,536,873; 2,601,766; 3,160,185; 3,181,198; 3,259,415; 3,265,068; 3,306,139; 3,596,965; 3,664,703; 3,936,934; 4,199,180; 4,314,724; 4,728,139; 4,768,288; 4,976,718; U.S. Pat. Des. Nos. 189,488; 253,083; 297,008; 299,996; 313,537; and U.S. Pat. No. 4,955,897.

A number of such utensils, as provided in U.S. Pat. No. 4,768,288 are directed to salad tongs. Tongs as represented by this prior art include pairs of arms 2 coupled to fulcrums with a gripping jaw provided at the front of each arm. These types of tongs may have a unitary construction and are formed to spring open automatically upon release of a manual grasp. However, such types of tong members do not provide for cutting and slicing with pit removal elements as provided in the subject invention system for the purposes and objectives of the subject concept.

Other utensils such as that shown in U.S. Pat. No. 1,326,373 are directed to fruit knives. Such knives comprise a U-shaped handle portion with cutting blades integrally formed at the respective ends of the handle portions. However, this type of utensil does not provide for the serrations in the spoon shaped end sections as is necessary to the subject invention concept. Other references as those systems depicted in U.S. Pat. No. 3,936,934 are directed to culinary coring devices. In those prior art systems U-shaped handle elements having legs coupled at a junction are provided. A pair of spoon bowls are attached to the legs respectively however, they do not provide for the combination of elements for the total operation of the subject concept system.

SUMMARY OF THE INVENTION

A food utensil is provided for cutting, slicing or severing the food product and removing food material therefrom. The food utensil includes a flexible U-shaped gripping member having a base section joined to a pair of arm members. Each of the arm members have a first end section joined to the base section and a second end section. Each of the second end sections are spoon shaped in contour and include serrations formed within an inner edge surface of each spoon shaped section.

It is an object of the subject invention concept to provide a food utensil for manually severing or slicing a food product through a thickened skin portion.

It is a further object of the subject invention to provide a manually actuatable food utensil item which will allow cutting a food product substantially in half either horizontally or vertically down to the pit member.

Further, it is an object of the subject invention concept to provide elements in the food utensil product which will allow gripping or grasping of a pit and simple removal through a twisting and/or pulling action once the food product has been sliced.

Still further, this invention has as an object the concept of allowing a one piece molded food utensil product to be used for scooping of material from internal a food product.

A further object of the subject invention is to provide a combination food utensil tool which allows a simple process for neatly and easily cutting a food product, removing a pit from the food product without excessive damage to the food material contained therein and then a scooping function to allow simple removal of the food material from within the cut or severed food product.

Additionally, a further object of the subject invention concept is to provide a unitarily formed and molded food utensil which is inexpensive to produce and has a multiplicity of functions.

DESCRIPTION OF THE PREFERRED EMBODIMENTS

Figure 1:
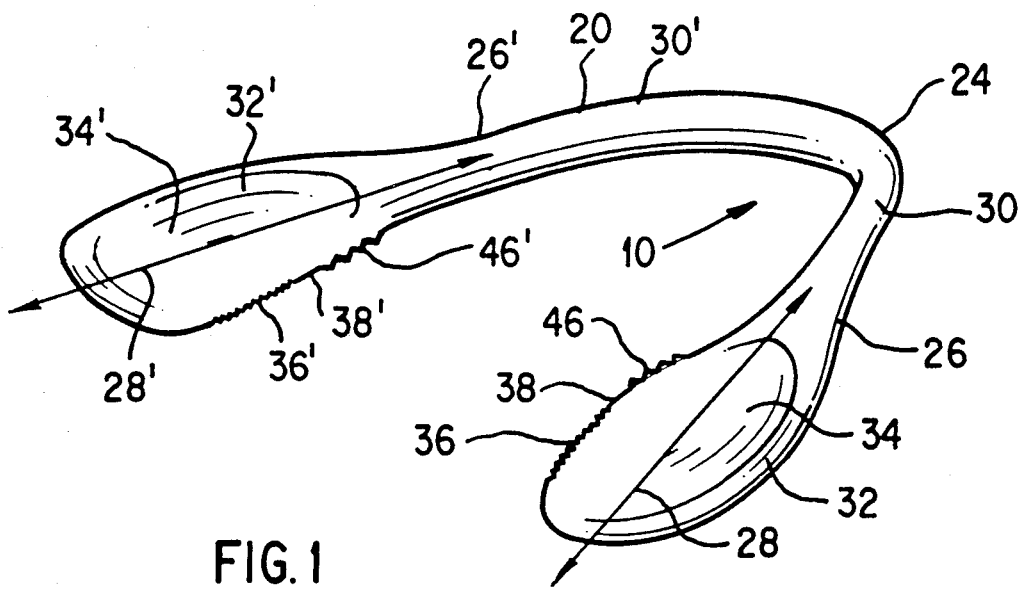
FIG. 1 is a perspective view of the food utensil of the subject invention concept.

Referring now to FIGS. 1-4, there is shown food utensil 10 for cutting food product 12 and removing material contained therein. In general, food product 12 may be any one of a wide variety of fruits or vegetables and in particular may be food product 12 having a relatively thickened skin 14 and pit 16 for removal. As will be seen in following paragraphs, food utensil 10 may be utilized for initially cutting through or severing thickened skin 14 and further cutting or passing through food material 18 of food product 12.

In particular, food utensil 10 is adapted particularly to cutting and severing food product 12 when such is in the form of an avocado. Food product or avocado 12 particularly has thickened skin 14 with a relatively soft food material 18 contained therein. Pit 16 of avocado 12 is generally relatively large and as will be shown in following paragraphs may be easily removed through manual use of food utensil 10. Through use of food utensil 10 as herein described, food product 12 may be utilized to provide a finely cut food product which is esthetically pleasing subsequent to the cutting and pit removal action. Still further, as will be seen, food utensil 10 may be used to scoop out food material 18 from an internal chamber created by the cutting and pit removal action.

Figure 2:
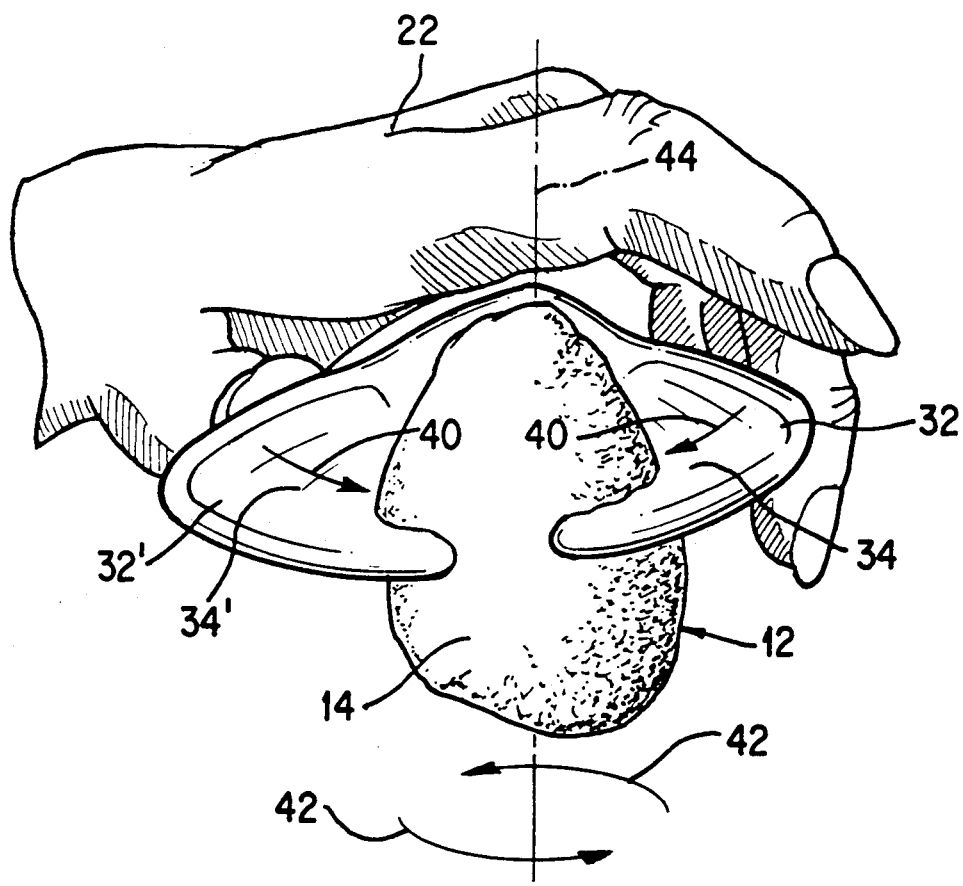
FIG. 2 is a perspective view of the food utensil shown in FIG. 1 being grasped and interfaced with a food product.

In general, food utensil 10 includes U-shaped gripping member 20 as shown in FIG. 1 adapted to be grasped in user hand 22 as is shown in FIG. 2. Flexible U-shaped gripping member 20 includes base section 24 joined to arm members 26, 26'. Each of arm members 26, 26' extend in an extended length direction 28, 28' as seen in FIG. 1.

Food utensil 10 and flexible U-shaped gripping member 20 is formed of a material which may be flexed and is reversibly displaceable in a direction substantially normal to extended length directions 28, 28' to allow grasping of avocado or food product 12. Food utensil 10 may be formed of a plastic material composition such as a thermoplastic composition which allows return from a compressed state shown in FIG. 2 to the open state shown in FIG. 1. Further, food utensil 10 may be formed in a mold or some like technique to provide a one piece formation of food utensil 10. Additionally, food utensil 10 may be stamped from a metal composition material such as steel, aluminum or some like material composition which would allow a flexible spring like displacement.

In this manner, a relatively inexpensive manufacturing procedure may be attained to provide a low cost, and inexpensive food utensil 10 having a wide variety of uses to allow a user not only to neatly cut through food product 12 but allows further removal of pit 16 without damage to internal food material 18 and then finally allows the user to neatly scoop out food material 18 from within food product 10.

Arm members 26, 26' each include first end section 30, 30' respectively which are clearly seen to be joined to base section 24 generally in one piece formation to include a continuous interface between first end sections 30, 30' and base section 24. Arm members 26, 26' further include second end sections 32, 32' which are spoon shaped in contour. Each of second end sections 32, 32' includes second end section inner arcuate surfaces 34, 34'. Second end section inner arcuate surfaces 34, 34' are arcuate in a direction normal respective direction lines 28, 28' and further are arcuate in a plane substantially coninicident with extension length direction lines 28, 28'. In this manner, second end sections 32, 32' are given a spoon type contour which allows for scooping and removal of food material 18 subsequent to the initial severing, cutting and pit removal process as herein described.

Figure 3:
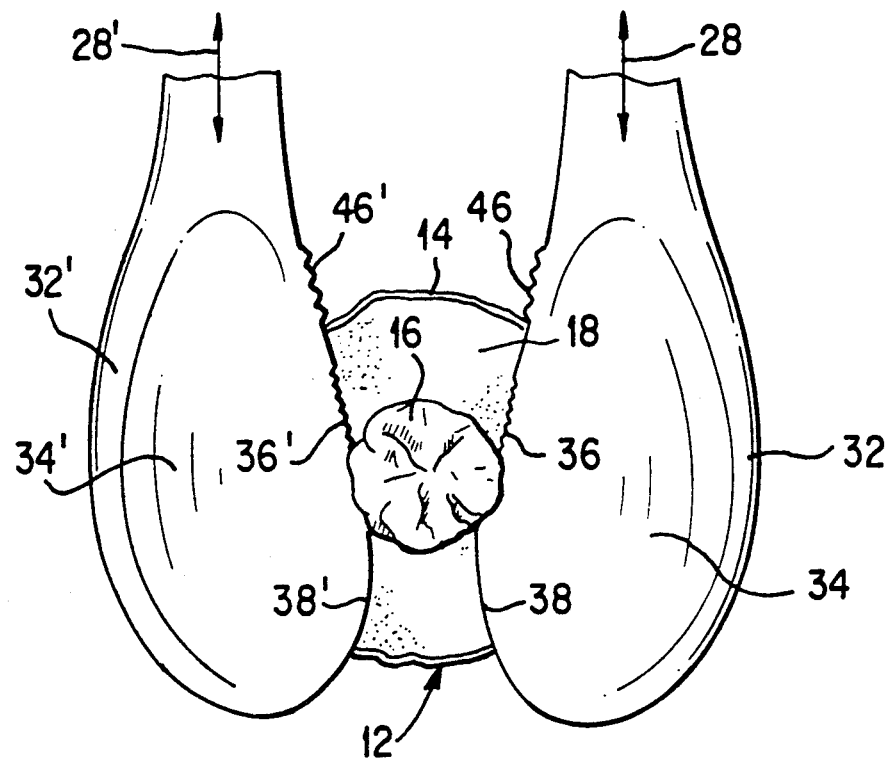
FIG. 3 is a plane view taken partially in cut-away of the food utensil slicing or severing a food product; and, FIG. 4 is a plane view, partially in cut-away showing the food utensil grasping or gripping the pit of a food product subsequent to the severing or cutting process.
Figure 4:
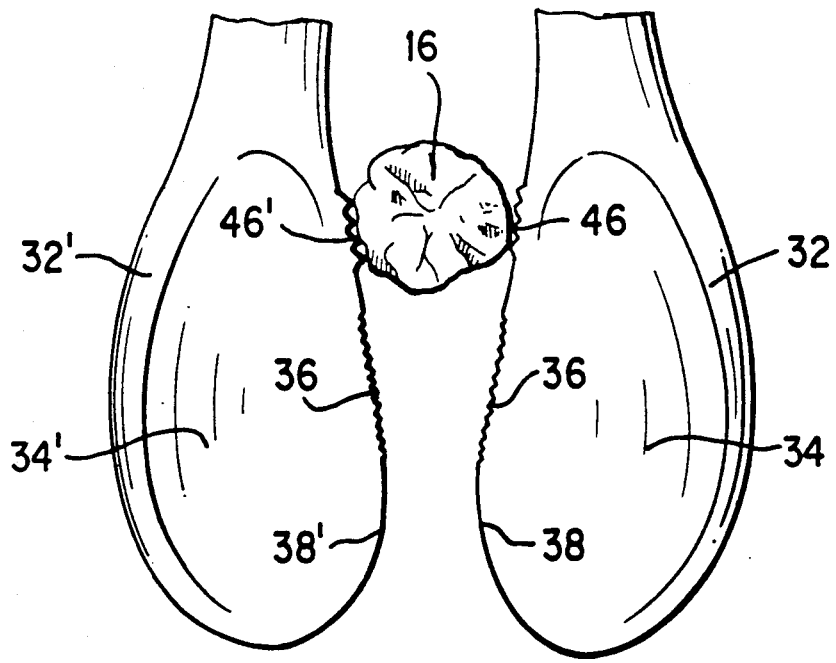

As seen in FIGS. 1, 3 and 4, each of spoon shaped second end sections 32, 32' include serrations, cutting blades or teeth 36, 36' formed within respective inner edge surfaces 38, 38'. Serrations or cutting blades 36, 36' form a first set of tooth members formed on opposing inner edge surfaces 38, 38' in aligned relation each with respect to the other. Serrations 36, 36' as is seen in FIGS. 1, 3 and 4, extend throughout a portion of inner edge surfaces 38, 38' to allow gripping and cutting of food product or avocado 12 as shown in FIG. 2.

In use, as shown in FIG. 2, avocado 12 is placed between second end sections 32, 32' of arm members 26, 26'. Arm members 26, 26' are flexed and displaced in coincidence with directional arrows 40 until avocado 12 is gripped between opposing teeth or serrations 36, 36'. Avocado 12 may then be rotated in the direction defined by directional arrows 42 about vertical direction 44 to provide a cutting or severing action. Thickened skin 14 is thus severed and the cutting or severing action may be continued until pit 16 is reached as shown in FIG. 3. Continuous rotation of avocado 12 about vertical direction access 44 allows for a smooth and clean severing or cutting operation. Obviously, the rotation of avocado or food product 12 is only in relation or with respect to food utensil 10 and thus food utensil 10 may also be rotated to provide the same relative rotation between the food product 12 and food utensil 10 to accommodate a proper and clean cutting action. Obviously, FIGS. 2 and 4 are only illustrative of one cutting technique. Avocado 12 may be rotated about axis line 44 and cut in a direction normal or perpendicular to line 44 if desired by the user, or alternatively about any inclined line to axis line 44.

Food utensil 10 further includes a second set of tooth members 46, 46' as shown in FIGS. 1, 3 and 4 formed on first end sections 30, 30', in a transition section between first and second end sections, or even at an end portion of second end sections 32, 32', respectively of each of arm members 26, 26'. Second set of tooth members 46, 46' are formed on inner edge surfaces 38, 38' in aligned relation each with respect to the other. Second set of tooth members 46, 46' are utilized to remove pit 16 from the internal portion of food product 12. Once food product 12 has been severed or cut to the general area of pit 16 as shown in FIG. 3, arm members 26, 26' may be released and allowed to expand and then second set of tooth members 46, 46' are brought into contact with the outer surface of pit 16. The bottom half of the food product 12 may be grasped by the user's hand and pit 16 removed in one process step by merely twisting or pulling out pit 16 from surrounding food material 18.

As can be clearly seen, serrations or teeth 36, 36' forming a first set of tooth members have a root or depth less than the depth or root of second tooth members 46, 46'. Additionally, the pitch of serrations 36, 36' are substantially less than the pitch for second set of tooth members 46, 46' since serrations 36, 36' are mainly used for cutting or severing whereas second tooth members 46, 46' are used for gripping an irregular surface formed by pit 16 and thus each of tooth members 36, 36' and 46, 46' are used for different purposes during the removal process.

Once pit 16 has been removed there is provided material 18 within an internal chamber of food product 12. Second end sections or spoon ends 32, 32' may then be overlapped and used as a scoop utensil to remove material 18 or in the alternative a single end section 32 or 32' may be used to scoop out food material 18 in a standard manual operation.

In this manner, there is provided food utensil 10 for cutting, slicing, or severing through skin portion 14 of food product 12 and removing food material 18 from food product 12 in a manner which allows for easy access to food material 18 and is esthetically pleasing if portions of food product 12 are to be incorporated in a food display. Resilient and flexible member 20 has opposingly displaced arm members 26, 26' with each of arm members 26, 26' extending in an extended length direction 28, 28'. Scoop end sections 32, 32' are provided having serrations 36, 36' formed on respective inner edge surfaces 38, 38' for engaging an external surface of food product 12. Scoop end sections 32, 32' are reversibly displaceable through manual action toward each other when extended length sections 30, 30' of arm members 26, 26' are grasped in user's hand 22.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A food utensil for cutting a food product and removing material therefrom, comprising:
    a flexible U-shaped gripping member having a base section joined to a pair of arm members, each of said arm members having a first end section joined to said base section and a second end section, said second end section being spoon shaped in contour, each of said spoon shaped end sections having serrations formed within an inner edge surface, said serrations defining a first set of tooth members formed on said second end section, and a second set of tooth members formed on said arm members, said first set of tooth members for cutting said food product and said second set of tooth members for securely gripping and removing a pit of said food product.

2. The food utensil as recited in claim 1 where said first end sections of each of arm members define an extension length direction.

3. The food utensil as recited in claim 2 where each of said arm member spoon shaped second end sections include an arcuate inner surface in a plane substantially normal said extension length direction.

4. The food utensil as recited in claim 3 where each of said arm member spoon shaped second end sections include said arcuate inner surface being arcuate in a plane substantially coincident with said extension length direction.

5. The food utensil as recited in claim 1 where said serrations form said first set of tooth members on opposing inner edge surfaces of said arm members in aligned relation each with respect to the other.

6. The food utensil as recited in claim 5 where said serrated first set of tooth members extend throughout a predetermined portion of said inner edge surfaces of said spoon shaped end sections.

7. The food utensil as recited in claim 6 where each of said second set of tooth members are formed on an inner surface of each of said arm members in aligned relation each with respect to the other.

8. The food utensil as recited in claim 7 where said serrations form a first set of tooth members having a depth less than the depth of said second set of tooth members.

9. The food utensil as recited in claim 8 where said first set of tooth members define a first tooth pitch and said second set of tooth members define a second tooth pitch, said second tooth pitch being greater than said first tooth pitch.

10. The food utensil as recited in claim 1 where said flexible U-shaped gripping member is adapted to be grasped in a hand of a user by said arm member first end sections.

11. The food utensil as recited in claim 1 where said flexible U-shaped gripping member is formed in one piece continuous formation.

12. The food utensil as recited in claim 11 where said U-shaped gripping member is molded.

13. The food utensil as recited in claim 12 where said U-shaped gripping member is formed of a plastic composition material.

14. The food utensil as recited in claim 11 where said serrations formed on said arm members are adapted for cutting a skin portion of said food product.

15. A food utensil for slicing through a skin portion of a food product and removing food material from said food product comprising:
    a resilient and flexible member having opposingly displaced arm members, each of said arm members having an extended length section defining first and second scoop end sections, each of said scoop end sections having serrations formed on a respective inner edge surface for engaging an external surface of said food product, said first and second scoop end sections being reversibly displaceable toward each other when said extended length sections are grasped in the hand of a user, said serrations defining a first set of tooth members formed on said scoop end sections and a second set of discrete tooth members formed on said arm members.

16. The food utensil as recited in claim 15 where said serrations form said first set of tooth members, extending throughout a predetermined periphery portion of said inner edge surface of each of said scoop end sections of said respective arm members.

17. The food utensil as recited in claim 16 where said second set of tooth members are formed on an inner surface of said arm members, said second set of tooth members having a predetermined depth and pitch adapted for engaging a pit of said food product and removal therefrom.

18. The food utensil as recited in claim 15 where said resilient and flexible member is formed in one piece formation, said resilient and flexible member being formed of a plastic material composition.

19. The food utensil as recited in claim 18 where said food utensil is formed in a continuous molded one piece formation.

* * * * *